March 22, 1955 R. ADELL 2,704,687
PROTECTIVE TRIM MOLDING FOR VEHICLE DOOR EDGES
Filed July 8, 1954

INVENTOR.
ROBERT ADELL
BY Gregory S. Dolgorukov
ATTORNEY.

United States Patent Office 2,704,687
Patented Mar. 22, 1955

2,704,687

PROTECTIVE TRIM MOLDING FOR VEHICLE DOOR EDGES

Robert Adell, Detroit, Mich.

Application July 8, 1954, Serial No. 442,119

1 Claim. (Cl. 296—44)

This invention relates to motor vehicles and more particularly to improved bodies therefor. The invention has particular reference to provision of ornamental and protective moldings applied to the trailing edge of the doors of automobile bodies.

My co-pending applications disclose automobile bodies in which the trailing edges of their swinging closures, particularly door, are provided with ornamental and protective molding applied to at least lower portions of such edges. Such expedient proved to have solved very difficult problems in this particular art. Many thousands of automobiles now on the road, including some of the highest priced automobiles as they come out from the factory, are now equipped with my ornamental and protective molding.

While provision of such moldings has solved the problem referred to above, there developed in the practical use of such moldings a number of serious problems, particularly in providing securing or holding means whereby such moldings can be applied to a relatively thin painted edge without damaging the paint thereon and thus starting rusty spots on the flat surfaces of the edge, and whereby the molding would be retained on said edge without becoming loose or coming off either bodily or at one of its ends.

One of the objects of the present invention is to provide an improved construction for the molding of this general character whereby the difficulties and disadvantages of the prior art are overcome and largely eliminated, and novel means are provided whereby the molding is held at the door edge tightly and resiliently irrespective of manufacturing variations such as those caused by variance in thickness of sheet metal stock or due to high local spots.

Another object of the present invention is to provide a molding the appearance of which does not appear to be distorted even when the molding is applied to door edges having considerable number of high raised spots.

A further object of the present invention is to provide an improved ornamental and protective molding for trailing edges of automobile doors, which can be easily slipped on the door edge without damaging the paint thereof and be retained thereon in a secure manner without tendency to slip off the edge.

A still further object of the present invention is to provide an improved ornamental and protective molding of the above nature, which can be slipped on the door edge by hand but which cannot be taken off merely by pulling on the molding but may have to be opened by application of a tool before it can come off from the edge.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention, I provide an ornamental and protective molding having a sufficiently large cross section to house the trailing edge to which the molding is applied, considering possibility of increased thickness and presence of raised spots. The portions of the molding's cross section coming closest together are in the form of curls bent at such angles that the molding is being spread in its cross section when it is pushed over the edge of the door. However, after the molding is pushed all the way into place, one of the curls contacts the edge of a bent cover sheet of the door at such an angle that withdrawal of the molding merely by pulling it off is made difficult.

Figure 1:
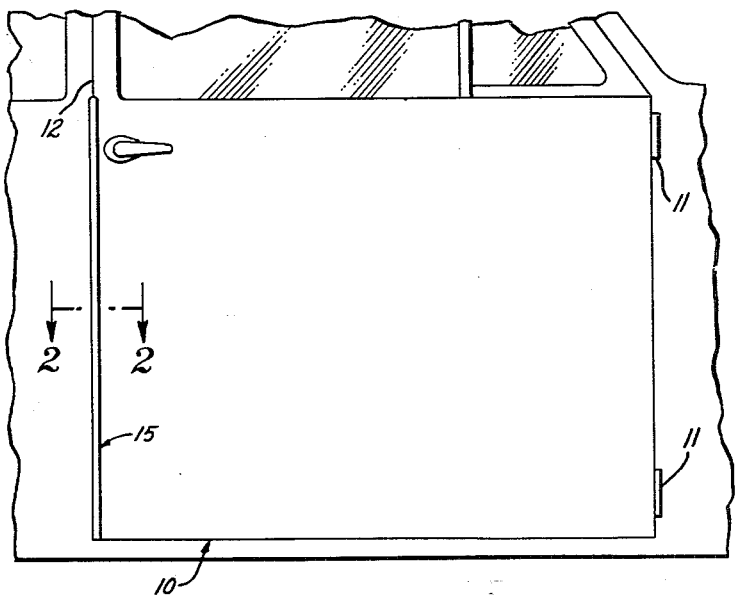
Fig. 1 is an elevational fragmentary view of an automobile body, and particularly of the door thereof, showing the ornamental molding applied to the trailing edge of said door.

In the drawings there is shown, by way of example, an ornamental and protective molding adapted to be applied to a trailing edge of an automobile door and embodying the present invention. Referring specifically to the drawings, the automobile door shown therein and generally designated by the numeral 10 may be of any suitable construction. The door is adapted to be hinged to the body construction at hinges 11 in a manner well known in the art, and it has a vertically extending trailing edge 12. The ornamental and protective molding, generally designated by the numeral 15, is applied to the lower portion of the edge 12, as shown in Figs. 1, 2 and 3.

Figure 2:
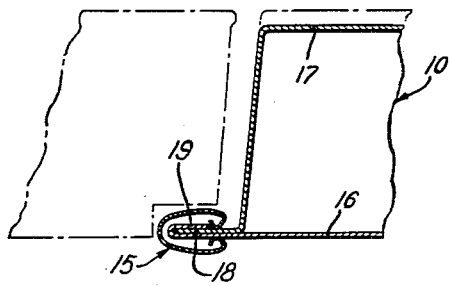
Fig. 2 is a sectional view taken in the direction of the arrows on a section plane passing through the line 2—2 of Fig. 1.
Figure 3:
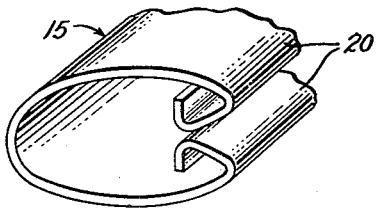
Fig. 3 is a fragmentary perspective view of a molding strip shown separately.

Referring to Fig. 2, the door 10 may include a front or cover sheet 16 and a back sheet 17 having a flange 18 extending parallel and contacting the cover sheet 16, with the edge of said sheet 16 being bent over to overlie the flange 18 with a somewhat narrower flange 19.

The molding 15 has a generally elliptic or oval cross section with one open end. The free edges of the molding at its open end are bent inwardly to form curls 20, each consisting of portions 21 and 22 merging into each other at a rounded portion 23. The portion 21 makes with a line parallel of the axis of the cross section of the molding an angle A which is less than 55 degrees and is preferably approximately 30 degrees. On the other hand, the portion 22 of the curl makes with the same line an angle B which is greater than 55 degrees and is preferably between 75 and 90 degrees.

By virtue of such a construction, pushing the molding over the trailing edge of the door operates to spread the curls apart for getting over the flange 19, whereupon the curls 20 come together pinching the flange 19 and the edge of the sheet 16 to retain the molding in place. Since the molding is made of resilient sheet material, such as sheet steel, it can open up for a considerable distance without acquiring a permanent set, in order to be placed over increased thickness of the trailing edge and particularly over any raised spots that may be found thereon. After having been pushed over such raised spots and the flange 19, the curls come together as mentioned, due to the resiliency of the metal, with increased thickness of the edge and any raised spots thereon being housed within the confines of the elliptic or oval cross section of the molding and without tending to open the same.

Figure 4:
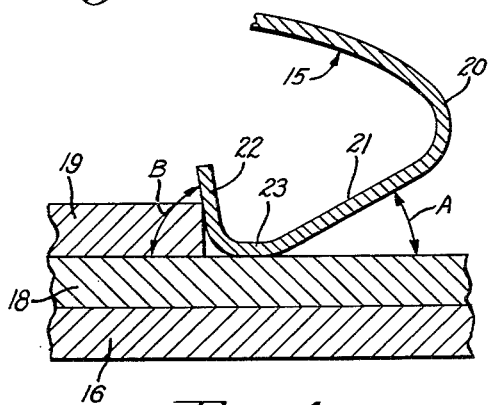
Fig. 4 is a fragmentary cross sectional view of one end curl shown on a larger scale.
Figure 5:
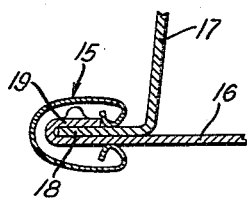
Fig. 5 is a sectional view similar in part to Fig. 2 but showing a molding on a somewhat larger scale and applied to a door having trailing edge of increased thickness, with a raised spot thereon.

Referring to Fig. 4, it will be seen that the portion 22 of the curl of the molding 15 contacts the edge of the flange 19 at such an angle that application on the molding of a force acting toward said edge cannot open up the molding for withdrawal thereof from the door edge. Thus, undesirable coming off of the molding or loosening thereof on the edge is eliminated. On the other hand, application of the molding to the edge is made easy and can be effected by hand.

It will also be noted that the rounded portions 23 of the curls do not present any sharp edges and, therefore, do not scratch or scuff the paint either in the process of application of the molding or withdrawal thereof from the edge of the door. Therefore, my improved molding may be used either with protective clips, such as are disclosed in my co-pending application, Serial No. 373,110, filed on August 10, 1953, now Patent No. 2,685,473, or without such clip and applied directly over the door edge.

For removal of my improved molding from the door edge, a screw driver or a similar tool is inserted under one of the curls at angle A providing sufficient recess for reception of the blade of such a tool, and the curl is slightly raised. Thereupon, the molding is pulled outwardly to get the rounded portion 23 on the flange 19. Thereupon, withdrawal of the molding from the edge is done by hand and merely by application of a slight pull.

By virtue of the above described construction the objects of the invention listed above and numerous additional advantages are attained.

I claim:

An ornamental and protective molding adapted to be applied to an automobile door along at least a portion of the trailing edge thereof, said molding comprising a strip of resilient sheet metal bent longitudinally to have a generally oval cross section with one open end, the free ends of the cross section at said open end being bent to provide curls directed inwardly of the oval, with the ends of the curls being bent to form an angle of more than 55 degrees with the larger axis of the cross section, and the portions of the curls adjacent to the legs of the cross section forming an angle of less than 55 degrees with said axis, with said curls coming closer together in the unapplied condition of the molding than they are disposed when applied to the thinnest practically encountered door edge, in order to exert resilient pressure on said edge when applied thereto.

References Cited in the file of this patent

UNITED STATES PATENTS

| | | |
|---|---|---|
| 1,800,060 | Farrington | Apr. 7, 1931 |
| 1,961,352 | Hall | June 5, 1934 |
| 2,118,800 | Smith | May 24, 1938 |
| 2,146,090 | O'Rourke | Feb. 7, 1939 |
| 2,685,473 | Adell | Aug. 3, 1954 |